US012568898B2

(12) United States Patent
Crowther et al.

(10) Patent No.: US 12,568,898 B2
(45) Date of Patent: Mar. 10, 2026

(54) AEROPONICS APPARATUS

(71) Applicant: LETTUS GROW LTD, Bristol (GB)

(72) Inventors: Benjamin George Crowther, Bristol (GB); Lillian Rose Manzoni, Bristol (GB); Madeleine Elizabeth Silberberg, Bristol (GB); James Michael Lofts, Bristol (GB)

(73) Assignee: LETTUS GROW LTD, Bristol (GB)

( * ) Notice: Subject to any disclaimer, the term of this patent is extended or adjusted under 35 U.S.C. 154(b) by 0 days.

(21) Appl. No.: 18/261,648

(22) PCT Filed: Jan. 14, 2022

(86) PCT No.: PCT/GB2022/050079
§ 371 (c)(1),
(2) Date: Jul. 14, 2023

(87) PCT Pub. No.: WO2022/153058
PCT Pub. Date: Jul. 21, 2022

(65) Prior Publication Data
US 2024/0081206 A1 Mar. 14, 2024

(30) Foreign Application Priority Data
Jan. 14, 2021 (GB) ...................................... 2100475

(51) Int. Cl.
*A01G 31/04* (2006.01)
(52) U.S. Cl.
CPC .................................. *A01G 31/045* (2013.01)

(58) Field of Classification Search
CPC .... A01G 31/045; A01G 31/04; A01G 31/042; A01G 31/00; A01G 31/01; A01G 31/02; A01G 31/03; A01G 31/05; A01G 31/06
(Continued)

(56) References Cited

U.S. PATENT DOCUMENTS

| | | | |
|---|---|---|---|
| 9,668,434 B2 | 6/2017 | Kernahan | |
| D809,965 S | 2/2018 | Linneberg | |

(Continued)

FOREIGN PATENT DOCUMENTS

| | | |
|---|---|---|
| CN | 1142534 A | 2/1997 |
| EP | 3258773 B1 | 1/2021 |

(Continued)

OTHER PUBLICATIONS

European Patent Office, International Search Report and Written Opinion of the International Searching Authority, in PCT/GB2022/050079, dated Apr. 25, 2022, which this application claims priority.

*Primary Examiner* — David J Parsley
*Assistant Examiner* — Sahar Almatrahi
(74) *Attorney, Agent, or Firm* — Kolitch Romano Dascenzo Gates LLP

(57) ABSTRACT

Aeroponics apparatus for commercial operation is disclosed, the aeroponics apparatus including a support structure comprising a power supply device, at least one shuttle movable on the support structure, the shuttle comprising a grow bed tray for holding crops, the shuttle comprising one or more nebulizers, for generating an aerosol for fertigating the crops in the grow bed tray, and a power connector to connect to the power supply device to supply power to the shuttle.

18 Claims, 18 Drawing Sheets

(58) Field of Classification Search
USPC ............................................................ 47/65
See application file for complete search history.

(56) References Cited

U.S. PATENT DOCUMENTS

| | | | |
|---|---|---|---|
| 9,986,694 | B2 | 6/2018 | Billingsley |
| 10,182,536 | B1 | 1/2019 | Andracki |
| 10,729,080 | B2 | 8/2020 | Staffeldt |
| 10,736,284 | B2 | 8/2020 | Baker |
| 11,457,577 | B1 | 10/2022 | Gao |
| 2005/0252080 | A1 | 11/2005 | Wright |
| 2015/0196002 | A1 | 7/2015 | Friesth |
| 2015/0313104 | A1 | 11/2015 | Cottrell |
| 2015/0334996 | A1 | 11/2015 | Licamele |
| 2016/0235023 | A1* | 8/2016 | Thoma ................... A01G 31/02 |
| 2017/0142912 | A1 | 5/2017 | Gasmer et al. |
| 2018/0325055 | A1* | 11/2018 | Krakover ............... A01G 31/06 |
| 2018/0359922 | A1* | 12/2018 | Millar ................... A01D 91/00 |
| 2019/0133062 | A1* | 5/2019 | Joseph ................... A01G 9/022 |
| 2019/0246571 | A1 | 8/2019 | Ingram-Tedd et al. |
| 2021/0282331 | A1* | 9/2021 | Isano ...................... H04N 7/188 |
| 2021/0360888 | A1 | 11/2021 | Farmer et al. |

FOREIGN PATENT DOCUMENTS

| | | | |
|---|---|---|---|
| JP | 3158233 | B2 | 4/2001 |
| KR | 10477087 | B1 | 12/2014 |
| KR | 20170049982 | A | 5/2017 |
| KR | 1020170089212 | A | 8/2017 |
| WO | 2019073073 | A1 | 4/2019 |

* cited by examiner (a)

(b)

(a)

(b)

(c)

(a)

(b)

AEROPONICS APPARATUS

TECHNICAL FIELD

The present disclosure relates to aeroponic apparatus and methods of crop production using such aeroponic apparatus.

BACKGROUND

Hydroculture such as hydroponics or aeroponics is a method of growing crops without soil. Aeroponics, in particular, offers the benefits of high density and rapid growth of crops.

Aeroponic systems supply crops with water and nutrients by spraying roots suspended below a plant support with an aqueous nutrient-rich solution. The plants are supported by, and their leaves and crowns extend above, the plant support. Aeroponic systems allow air to contact both the canopy and the roots of the crop plants so the crops grow with a plentiful supply of oxygen, carbon dioxide, water, and nutrients. Improved aeration of the roots is one of the advantages of aeroponics over hydroponics.

The sprayed nutrient solution may be produced in low pressure systems by low-pressure pumps delivering nutrient solution via jets. Low pressure systems are generally considered suitable only for domestic or demonstration aeroponics units and not large commercial aeroponics systems. Commercial and high density aeroponic cultivation uses high-pressure pumps delivering nutrient solution through spray nozzles. Spray nozzles in high pressure aeroponic facilities generally provide a wide spray pattern and are located along pressurized feedlines at regular intervals. Nutrient solution may be atomized into droplets in a range of size distributions depending on the nozzle design. Control over droplet size at the facility level is difficult, due to variation in nozzle quality and the pressure drop down the feedline. Control of the amount of water and nutrients supplied to the plant roots is controlled by the duration of spraying.

Ultrasonic nebulizers have also been used to generate aerosol droplet for aeroponic applications. WO-A-2019/073073 discloses aeroponics apparatus which includes a grow bed tray and a nebulizer for nebulizing nutrient solution, the nebulizer located at the base of the grow bed tray and comprising an ultrasonic transducer. The apparatus disclosed in WO-A-2019/073073 provides excellent results for commercial aeroponics facilities, nevertheless there is still a need for other aeroponics systems solutions including for highly productive facilities.

SUMMARY

It is an aim of the present disclosure to address this need.

The present disclosure accordingly provides, in a first aspect, aeroponics apparatus for commercial operation, the aeroponics apparatus comprising, a support structure comprising a power supply device, at least one shuttle movable on the support structure, the shuttle comprising a grow bed tray for holding crops, and optionally a power connector to connect to the power supply device to supply power to the shuttle, wherein the apparatus comprises one or more nebulizers (preferably ultrasonic nebulizers), for generating an aerosol for fertigating the crops in a or the grow bed tray.

Ultrasonic nebulizers include any nebulizer that uses ultrasonic energy (i.e. vibrations at a frequency above the audible range) to generate droplets (e.g. aerosols) for aeroponic uses. Ultrasonic nebulizers may include ultrasonically driven nebulizers.

In some embodiments of the apparatus, one or more ultrasonic nebulizers may be located on the support structure. Optionally the support structure may comprise at least one support trough. Optionally the support trough may have one or more nebulizers (e.g. ultrasonic nebulizers).

Thus, in a second aspect there may be provided aeroponics apparatus for commercial operation, the aeroponics apparatus comprising: a support structure comprising a power supply device, and at least one support trough; at least one shuttle movable on the support structure, the shuttle comprising a grow bed tray for holding crops, the support structure (optionally the support trough) comprising one or more nebulizers, for generating an aerosol for fertigating the crops in the grow bed tray, and a power connector to connect to the power supply device to supply power to the shuttle.

In addition or alternatively, one or more ultrasonic nebulizers may be located in or on a shuttle.

Thus, in a third aspect, there is provided aeroponics apparatus for commercial operation, the aeroponics apparatus comprising, a support structure comprising a power supply device, at least one shuttle movable on the support structure, the shuttle comprising a grow bed tray for holding crops, the shuttle comprising one or more nebulizers, for generating an aerosol for fertigating the crops in the grow bed tray, and a power connector to connect to the power supply device to supply power to the shuttle.

These aspects are advantageous because they provide a highly productive aeroponic system with low labor and flexible and productive crop arrangements.

The present disclosure is also beneficial because it allows improved automation of a greenhouse or other growing facility, to increase space efficiency as well as reducing labor cost. Such a facility has improved use of floor space because the space taken up by aisles to monitor plants may be reduced or eliminated. Vertical farms may retain aisles for access but address the space problem by building upwards, greenhouses may allow reduction or removal of aisles by using the present disclosure so that plants may be moved to an operator.

Aeroponics apparatus according to the present disclosure may allow increases in the growth rate efficiency of the greenhouse, making it a highly productive facility in terms of plant growth rate. Furthermore, automating aeroponics apparatus as in the present disclosure provides a doubly productive facility in terms of both space and growth.

A further advantage of the present disclosure is that because of improvement of efficiency it allows facilities of significant/large scale to become more cost competitive and improve return on investment even in view of the possible cost of the apparatus. Additionally, generally retro fitting of automated apparatus into existing facilities has been considered of high cost and complexity in the past. The present disclosure surprisingly allows more cost-effective retrofitting to existing facilities.

The apparatus may be adapted into a first in first out (FIFO), last in first out (LIFO) or any in any out (AIAO) arrangement in the first direction alone, depending on the spatial constraints and operation of the facility. Alternatively, the apparatus may be adapted into a first in first out (FIFO) arrangement in a first direction and/or may be adapted to have individual shuttles/grow bed trays accessible e.g. using loader/unloader gantries, e.g. in a second direction.

Such apparatus is also advantageous because it allows a vertical farming environment with crop needing less time under lights, lower operation and carbon costs, and increased economic efficiency.

Usually, the at least one shuttle will be moveable in a first direction in relation to (or on) the support structure, and/or in a second direction in relation to (or on) the support structure.

The at least one shuttle may comprise rolling portions to move the shuttle in the first direction and/or the second direction on the support structure. The rolling portions may cooperate with track portions extending in the first direction on the support structure and/or extending in the second direction on the support structure.

Alternatively, the support structure may comprise rolling portions to cooperate with the shuttle to allow the shuttle to move in the first direction and/or in the second direction on the support structure.

In another arrangement the support structure may comprise a conveyor device to move the shuttle in the first direction and/or second direction in relation to (or on) the support structure. The conveyor device may extend in the first direction on the support structure and/or extends in the second direction on the support structure. Generally, in this case, the shuttle may comprise one or more portions to cooperate with the conveyor device to move the shuttle.

In some apparatus where it is advantageous, the shuttle may be arranged to move in a third, vertical direction in relation to the support structure. To accomplish this, the apparatus may comprise a lifting device to move the shuttle in the third, vertical direction. An external lifting device (i.e. external to the support structure e.g. a robot arm or autonomous robot) may be used. Alternatively, the support structure and/or shuttle may comprise a lifting device.

The grow bed tray may be comprised in the shuttle. This may be achieved by providing a shuttle with a grow bed tray portion and/or a shuttle with an integral grow bed tray (e.g. formed as one piece).

Alternatively, the grow bed tray may be a separate grow bed tray (that may be removable) carried by the shuttle. This is advantageous because it allows grow bed trays (if removable) to be replaced on a shuttle or swapped between shuttles either when carrying crops or without crops.

The grow bed tray may hold crops in one or more plant trays (also known as crop trays) or holders. There may be one or more crop supports comprised in the grow bed tray and/or shuttle. The one or more crop support may be adapted to support crops and/or plant holders and/or plant trays, optionally at a predetermined spacing from the nutrient solution in the grow bed tray (in use).

The apparatus may further comprise at least one urging device to move the shuttle on the support structure. The at least one urging device may be mounted on the shuttle or mounted on the support structure. The urging device will usually comprise at least one motor.

The urging device may be incorporated in the support structure or in a shuttle and/or the urging device may comprise a loading mechanism for loading the shuttle on the support structure.

Generally, it is more efficient if the nebulizer is mounted on the base of the grow bed tray.

The nebulizer may comprise a spray nozzle (receiving water from a water reservoir). Preferably, however, the nebulizer comprises an ultrasonic transducer.

The power supply device may supply power to the nebulizer, optionally to the ultrasonic transducer and/or to other components in the apparatus for example horticultural lighting, one or more sensors and other devices, for example, a fan, one or more wheels, a pump, a valves and/or communication devices.

Conveniently, the power supply device may comprise a plurality of power supply docks on the support structure to cooperate with the power connectors on the shuttle. Alternatively, or additionally, the power supply device may comprise a power supply rail at least partly on the support structure to cooperate with the power connectors on the shuttle. The power supply device will usually comprise a safety switch, optionally a mechanical and/or inductive safety switch. There may be a manual override to the safety switch.

The power supply device may be integrated into the shuttle itself providing inductive or conductive power transfer between shuttles when they are in contact with one another. The or each shuttle may have one or more power connectors to connect to another. shuttle.

In some embodiments, the power supply device may be adapted to transmit power inductively to power connectors on the shuttle.

The grow bed tray may comprise a crop support for holding the crops spaced from the base of the tray to form a root space above the base of the tray.

In use, the grow bed tray may comprise water and nutrients in the bottom portion of the tray in contact with the nebulizer, optionally in acoustic contact with the ultrasonic transducer.

In use, the nebulizer (e.g. ultrasonic transducer) may generate an aerosol and/or a mist in the root space to fertigate the crops.

The apparatus may further comprise a water levelling mechanism to maintain an even water level in the base of the grow bed tray. The water levelling mechanism may include a siphon valve. A siphon valve is advantageous because it provides accurate filling and forced draining in the event of an overfill event.

The apparatus may further comprise a controller to control the nebulizer (e.g. ultrasonic transducer) and other components.

The support structure may further comprise a nutrient solution/water storage system and/or a water distribution apparatus to provide nutrient solution/water to the shuttle. Generally, the water storage system and/or the water distribution apparatus may comprise a particulate filter and, optionally, an ultraviolet treatment device, and optionally a nutrient dosing device.

The shuttle and/or grow bed tray will usually further comprise at least one liquid port for connection to the water distribution apparatus and for allowing water to flow into the base of the grow bed tray, optionally into the levelling device and then into the base of the grow bed tray. The apparatus may have a water levelling device and/or may have a divider or dividing wall with one or more gaps towards the base to allow water to pass through.

The at least one liquid port may be positioned anywhere on the shuttle and or grow bed tray.

The apparatus (preferably the support structure) may further comprise horticultural lighting. It is often useful in an automated apparatus if the apparatus (preferably the support structure), further comprises one or more sensors selected from moisture, light, pH, temperature, carbon dioxide, oxygen, infrared, and ultrasonic sensors.

When the nebulizer comprises ultrasonic devices, preferably the ultrasonic transducer or ultrasonic transducers is/are in acoustic contact with, and preferably compressed against, the base of the grow bed tray. Preferably the ultrasonic transducer or ultrasonic transducers are mounted under the grow bed tray to allow for access and improve thermal efficiency and cooling to reduce adverse heating in the grow bed tray which may affect yield of the crops. Often the ultrasonic transducer or ultrasonic transducers is/are held in a holder so that the ultrasonic transducer(s) may be easily mounted (and optionally dismounted e.g. for replacement or maintenance) in position. The or each grow bed tray may comprise 1 to 148 ultrasonic transducers, preferably 2 to 136 ultrasonic transducers, more preferably 4 to 124 ultrasonic transducers. There may, in one or more trays or in each tray, be 2 to 20 ultrasonic transducers per square meter of tray, preferably 4 per square meter to 16 per square meter; more preferably 4 per square meter to 14 per square meter; most preferably 4 per square meter to 12 per square meter.

Preferably, each nebulizer (preferably wherein the nebulizer comprises an ultrasonic transducer) may be controlled independently.

Preferably, the or each ultrasonic transducer comprises a piezoelectric transducer. Each ultrasonic transducer may have a resonant frequency, preferably in the kilohertz or megahertz range, and more preferably in the range 200 kHz to 100 MHz.

Ultrasonic nebulizers may in some embodiments be located on the support structure in addition to, or as an alternative to, being associated with the shuttle.

Thus, in a fourth aspect, there is provided an aeroponics apparatus for commercial operation, the aeroponics apparatus comprising, a support structure comprising a power supply device, at least one shuttle movable on the support structure, the shuttle comprising a grow bed tray for holding crops, and optionally a power connector to connect to the power supply device to supply power to the shuttle, wherein the apparatus comprises one or more ultrasonic nebulizers, for generating an aerosol for fertigating the crops in a or the grow bed tray.

Optionally, one or more of the ultrasonic nebulizers may be located on the support structure.

Aeroponics apparatus according to the present disclosure may be used to grow crops especially in commercial facilities.

Thus, in a fifth aspect, the present disclosure provides, a method for crop production, the method comprising,
a) providing aeroponics apparatus as discussed in the first aspect;
b) providing a plant support at the position spaced from the base of the grow bed tray to form a root space above the base of the tray,
c) providing crops in the plant support, and
d) providing water and nutrients at the base of the grow bed tray and nebulizing the water so that the nebulized aerosol nutrient solution contacts at least the roots of the crops, optionally in the root space.

Nebulizing the aqueous nutrient solution generally comprises nebulizing (preferably ultrasonically nebulizing) the solution to provide a controlled droplet size distribution. The droplet size distribution may comprise droplets having a diameter in the range 0.1 μm to 100 μm.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present disclosure will now be described further, with reference to the accompanying drawing, in which.

DETAILED DESCRIPTION

Figure 1:
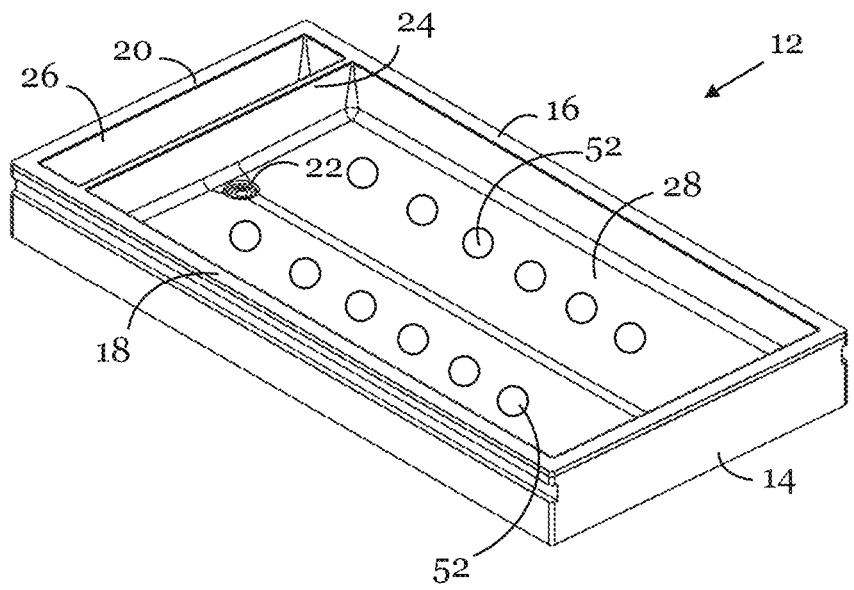
FIG. 1 is a perspective view of a single shuttle for use in the present disclosure.
Figure 2:
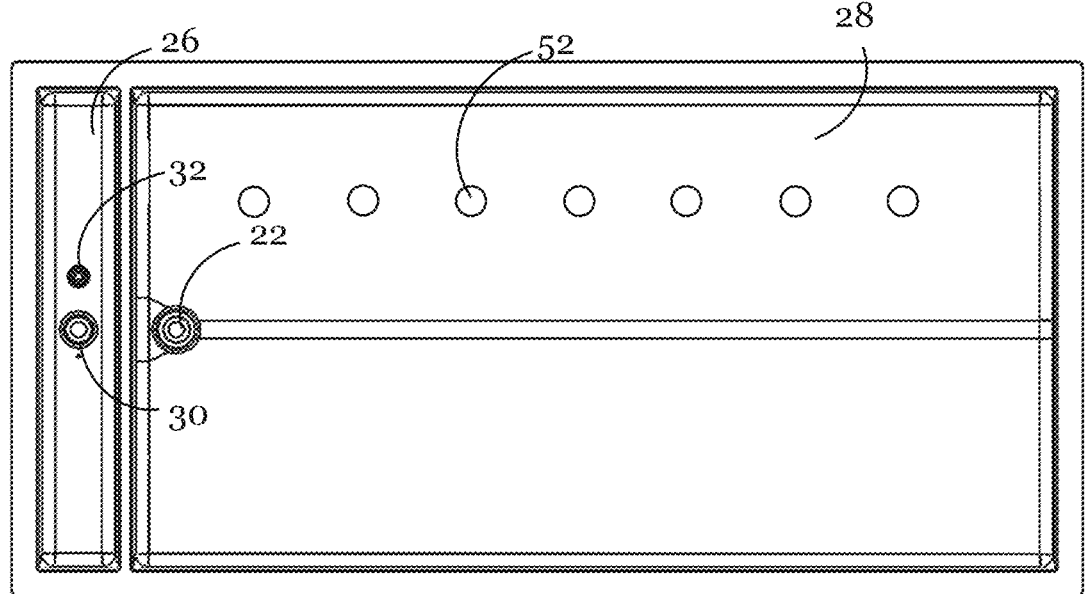
FIG. 2 is a top plan view of a single shuttle.
Figure 3:
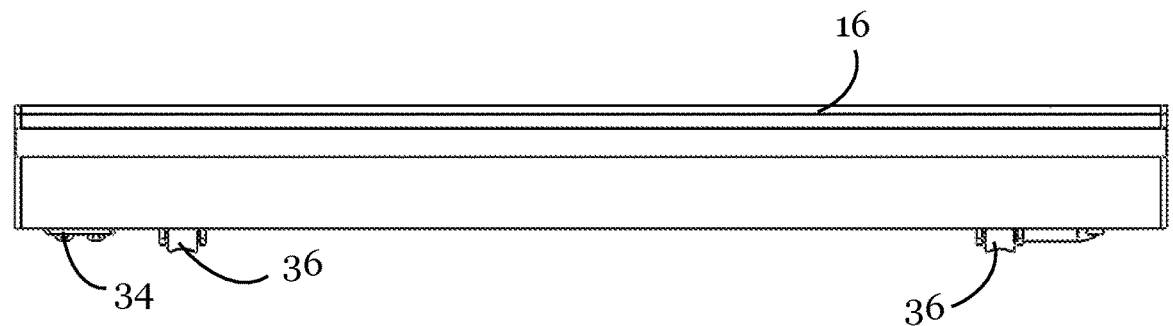
FIG. 3 is a side view of a single shuttle.
Figure 4:
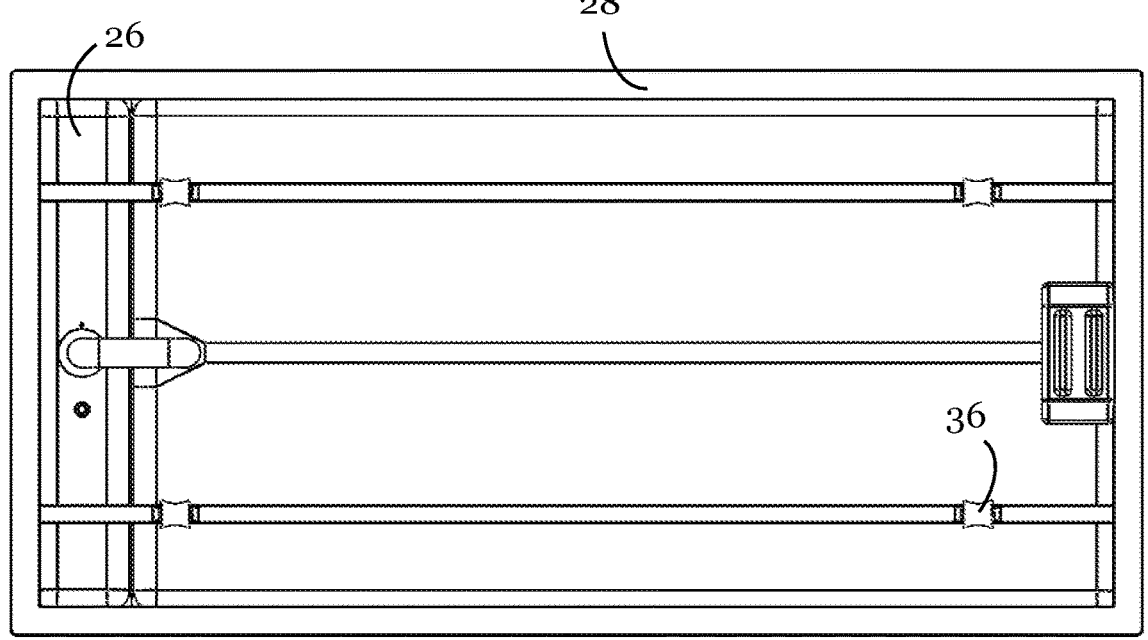
FIG. 4 is a bottom plan view of a single shuttle.
Figure 5:
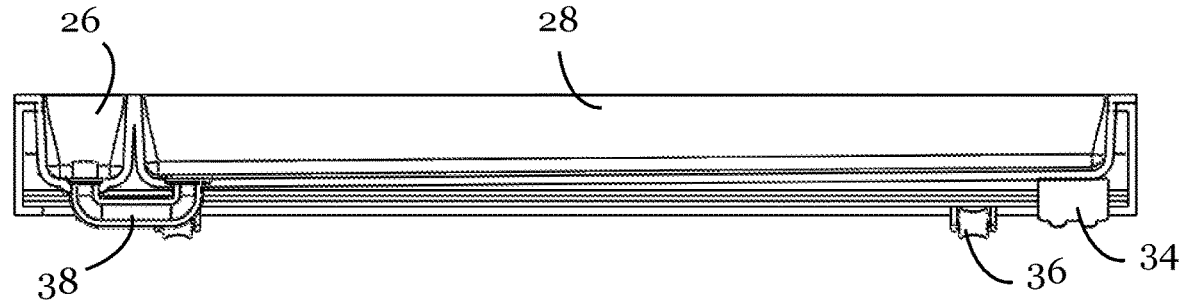
FIG. 5 is a sectional view on the centerline of a single shuttle.
Figure 6:
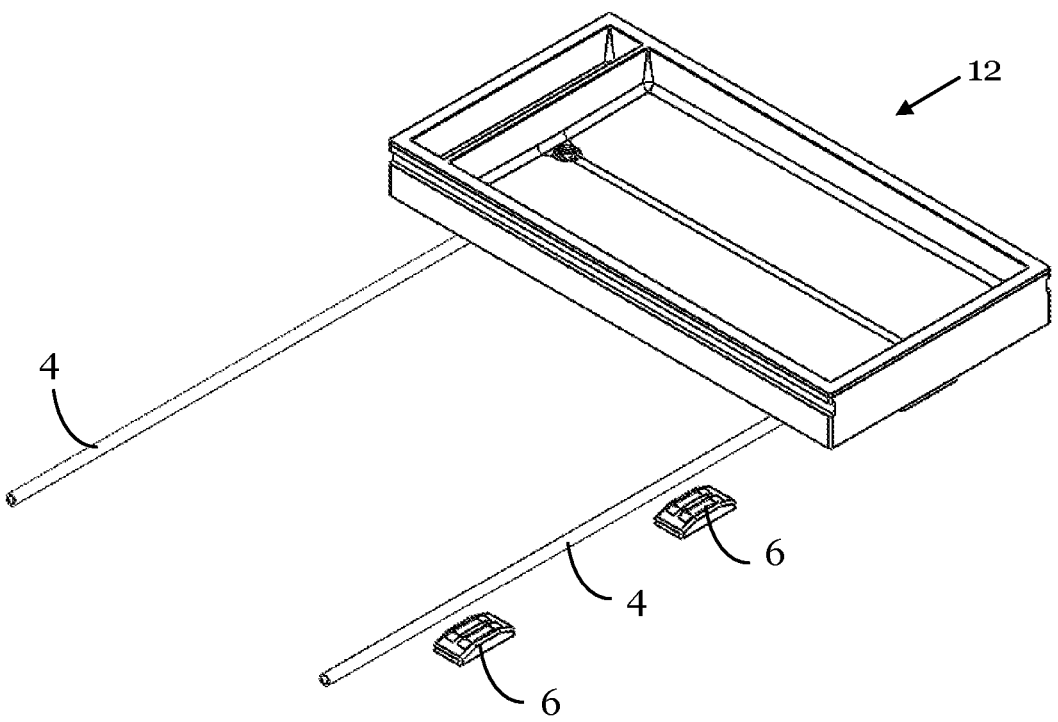
FIG. 6 is a perspective view of a single shuttle for use in the present disclosure showing the cooperation with rails on a support structure and power contact points on the support structure.
Figure 7:
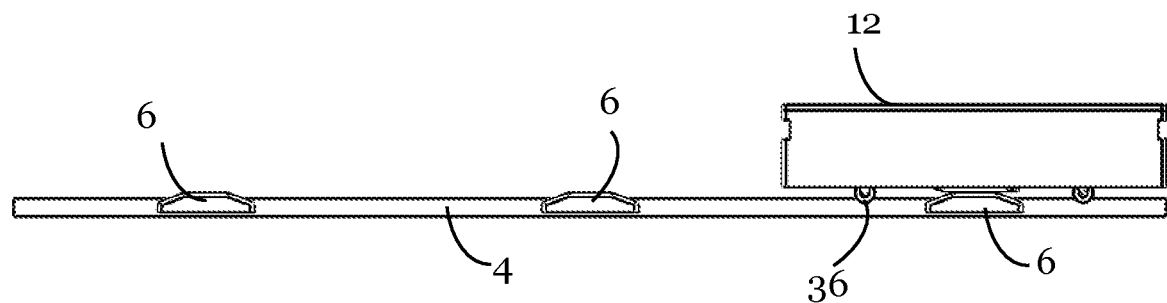
FIG. 7 is a side view of a single shuttle and rails as in FIG. 6.
Figure 8:
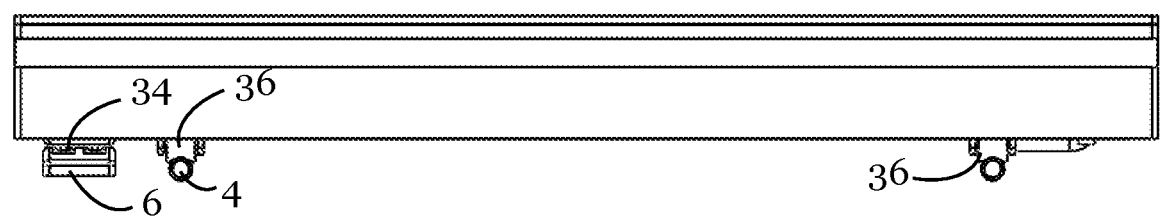
FIG. 8 is a front view of a single shuttle and rails as in FIG. 6.
Figure 9:
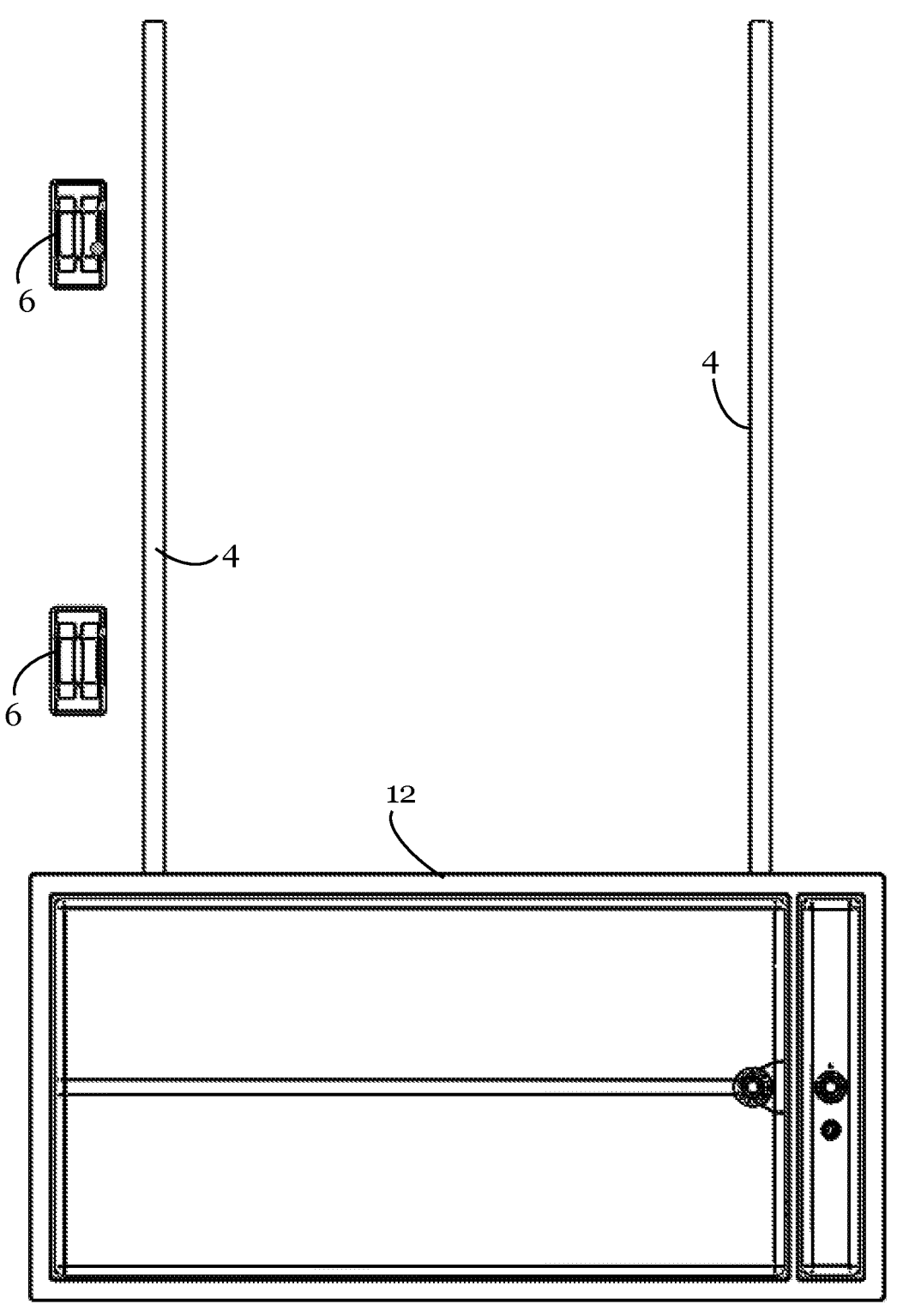
FIG. 9 is a top plan view of a single shuttle and rails as in FIG. 6.
Figure 10:
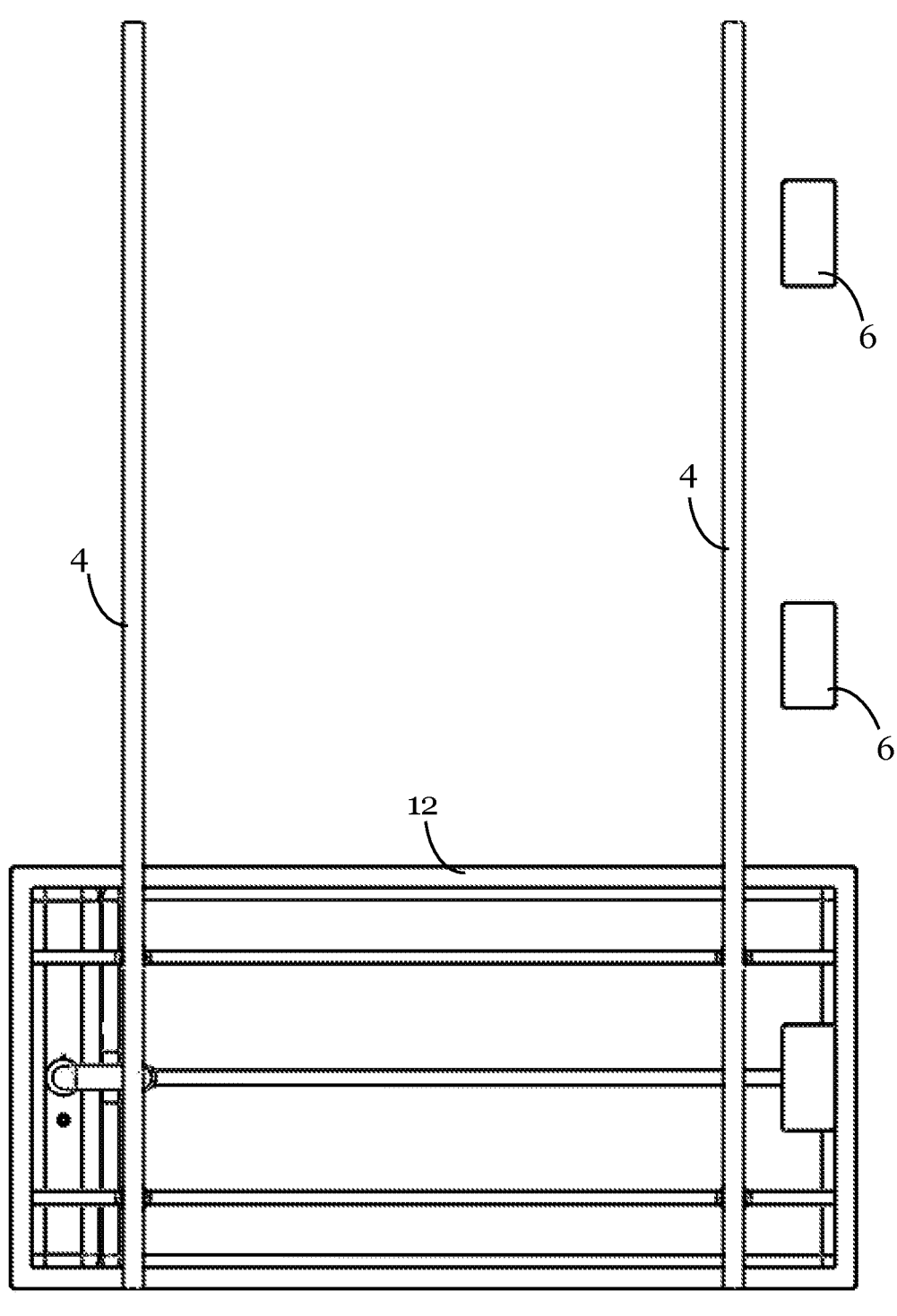
FIG. 10 is a bottom plan view of a single shuttle and rails as in FIG. 6.
Figure 11:
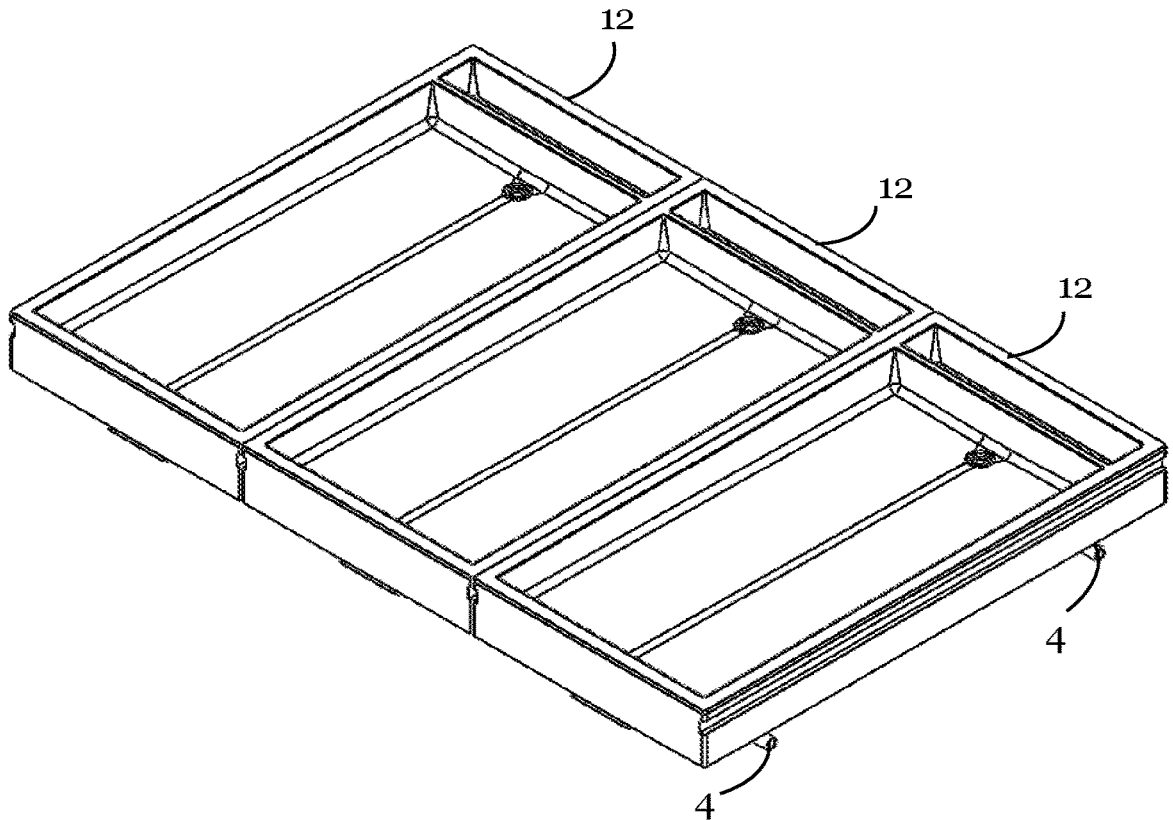
FIG. 11 is a perspective view of multiple shuttles and rails on a support structure.
Figure 12:
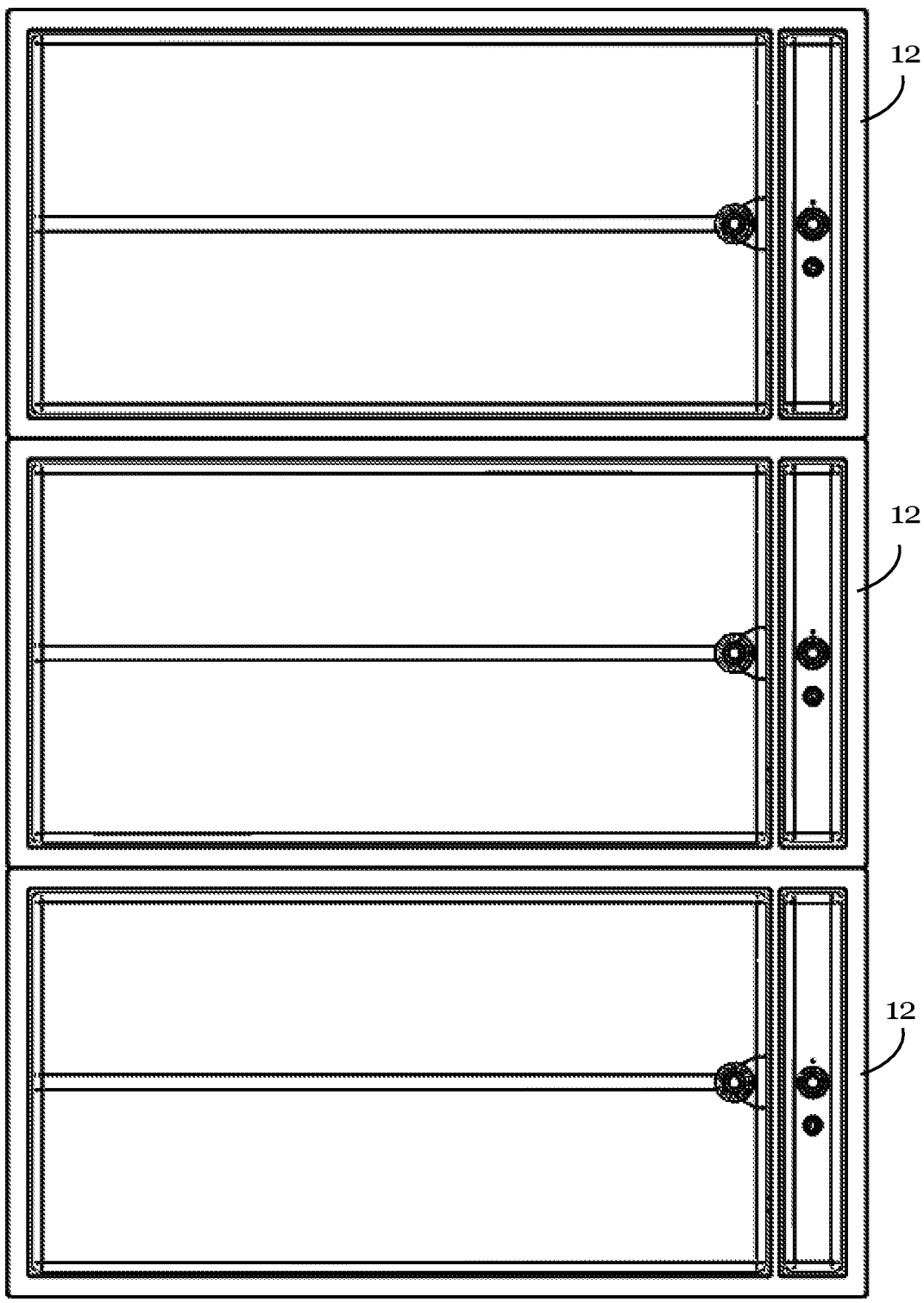
FIG. 12 is a top plan view of multiple shuttles and rails as in FIG. 11.
Figure 13:
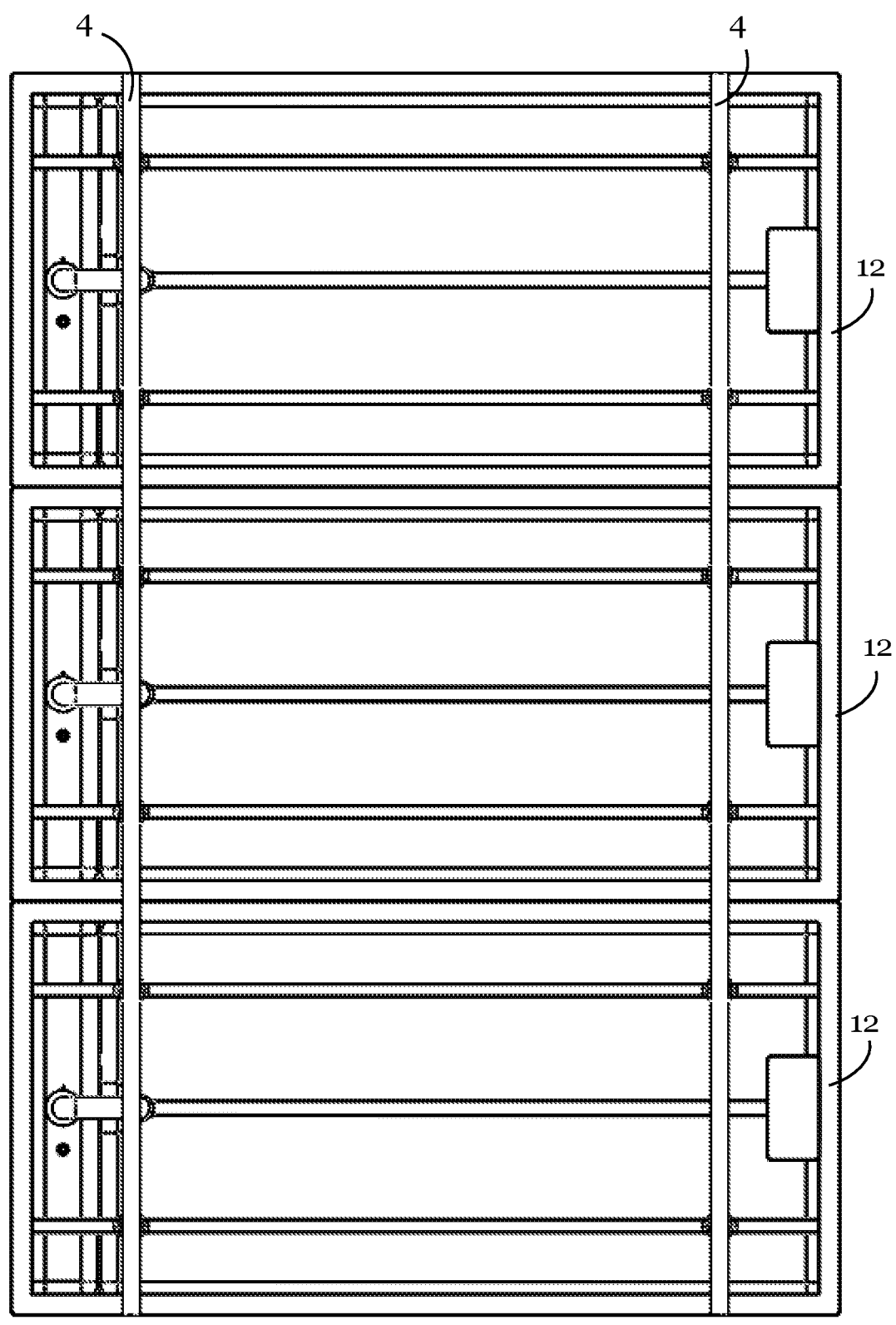
FIG. 13 is a bottom plan view of multiple shuttles and rails as in FIG. 11.

FIGS. 1 to 5 show a shuttle 12 for use in an aeroponics apparatus 2 of the present disclosure. The shuttle 12 comprises an integral grow bed tray 28, nutrient solution trough 26 (that may be, in form, a cistern, tank, vat, trench, gully, channel or culvert), first and second end walls 14, 20 and first and second side walls 16, 18. In some embodiments it may be useful if the tray is removable and/or changeable. The grow bed tray end wall 24 separates the grow bed tray 28 from the nutrient solution trough 26. Trough nutrient solution port 22 allows water/nutrients to enter the grow bed tray 28 from the nutrient solution trough 26 via trough nutrient solution port 30 through nutrient solution levelling device 38. Nutrient solution levelling device 38 ensures the nutrient solution level stays even and relatively constant. The grow bed tray comprises a plurality of ultrasonic nebulizers 52.

Figure 14:
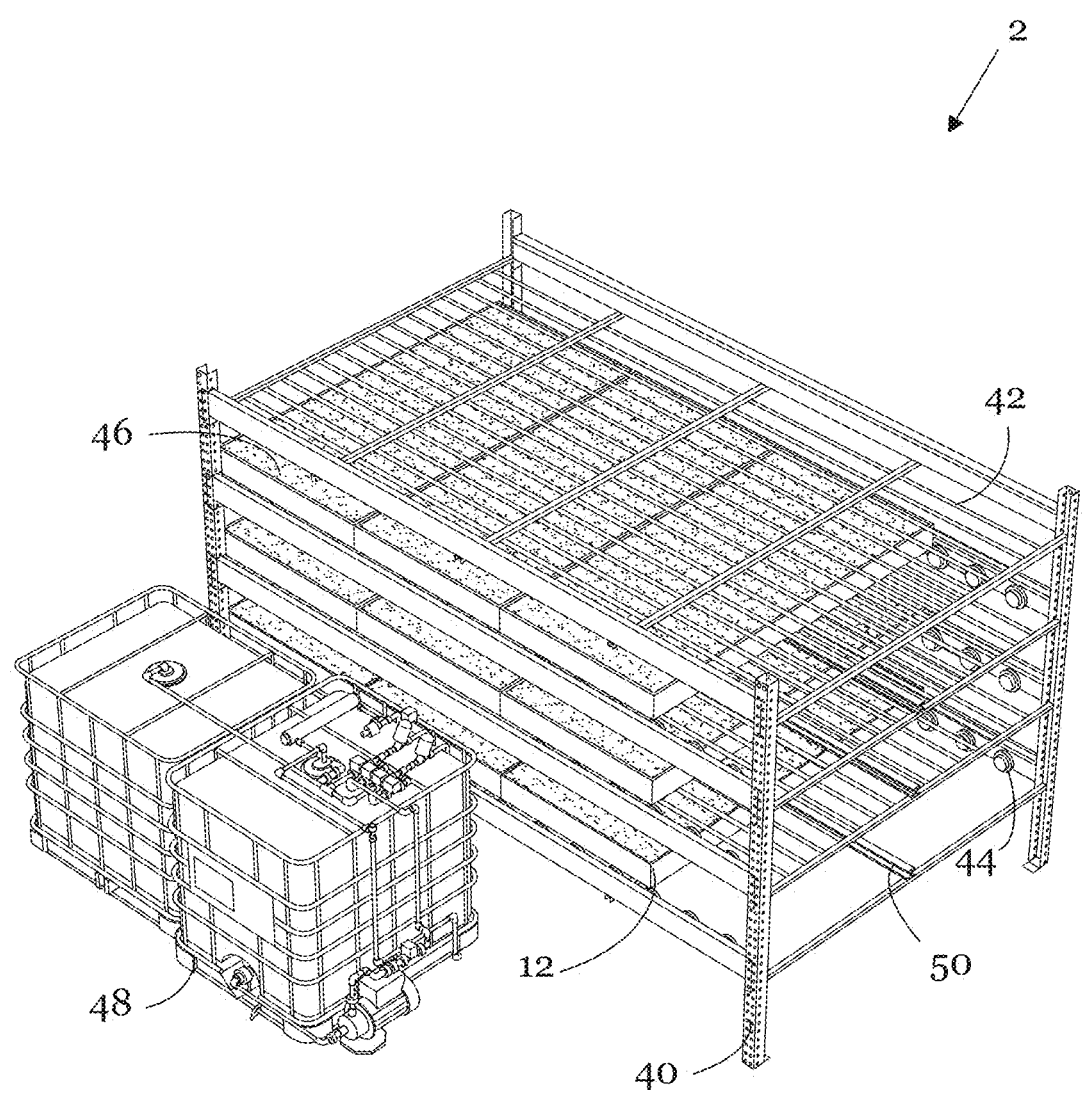
FIG. 14 is a perspective view of aeroponics apparatus according to the present disclosure showing the shuttle and the support structure with rolling sections.

Nutrient solution enters the nutrient solution trough 26 from trough nutrient solution inlet 32 connected to a nutrient solution reservoir 48 see FIG. 14).

The grow bed tray 28 comprises at least one nebulizer, usually an ultrasonic nebulizer in acoustic contact (in use) with nutrient solution. In operation, the nebulizer generates an aerosol (usually with droplets having a diameter in the range 0.1 μm to 100 μm) of nutrient solution in the grow bed tray and thereby fertigates the roots of crops suspended in the grow bed tray (crops not shown, see FIG. 14).

The shuttle 12 has shuttle rolling portions 36 that cooperate with rails on the support structure 40 to allow the shuttle to move.

FIGS. 6 to 13 show single and multiple shuttles 12 and rails 4 of the support structure. Each shuttle 12 is mounted on the support structure and the shuttle rolling portions 36 cooperate with the rails 4 to allow the shuttle 12 to move. Power supply devices 6 on the support structure supply electrical power to the shuttle 12 via shuttle power connectors 34 on the shuttle. Electrical power may be used to activate the ultrasonic transducers of the nebulizer to generate aerosol mist, operate horticultural lighting and sensors and for other devices.

FIG. 14 shows an alternative embodiment of the aeroponic apparatus of the present disclosure. The support structure 40 comprises support structure rollers 44 that cooperate with portions on the shuttles 12 to convey the shuttles 12 over the support structure 40. Horticultural lighting 42 is used to illuminate crops in grow bed trays 46. Nutrient solution is supplied from nutrient solution reservoir 48. Each grow bed tray 46 comprises at least one nebulizer, usually an ultrasonic nebulizer in acoustic contact (in use) with nutrient solution. Power is supplied to the support structure 40 and shuttle 12 via power rail 50. In operation, the nebulizer generates an aerosol (usually with droplets having a diameter in the range 0.1 μm to 100 μm) of nutrient solution in the grow bed tray and thereby fertigates the roots of crops suspended in the grow bed tray.

Figures 15, 16:
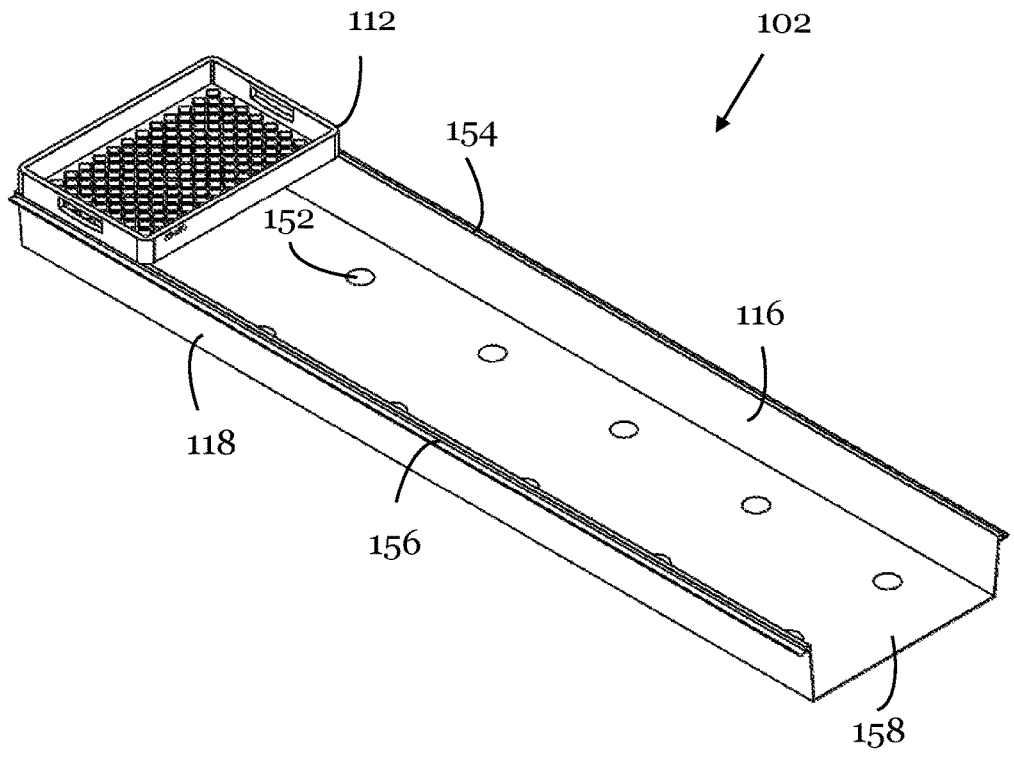
FIG. 15 is a perspective view of aeroponics apparatus according to the present disclosure showing the shuttle and part of the support structure.
FIG. 16 is an end view of the aeroponics apparatus of FIG. 15.
Figure 17:
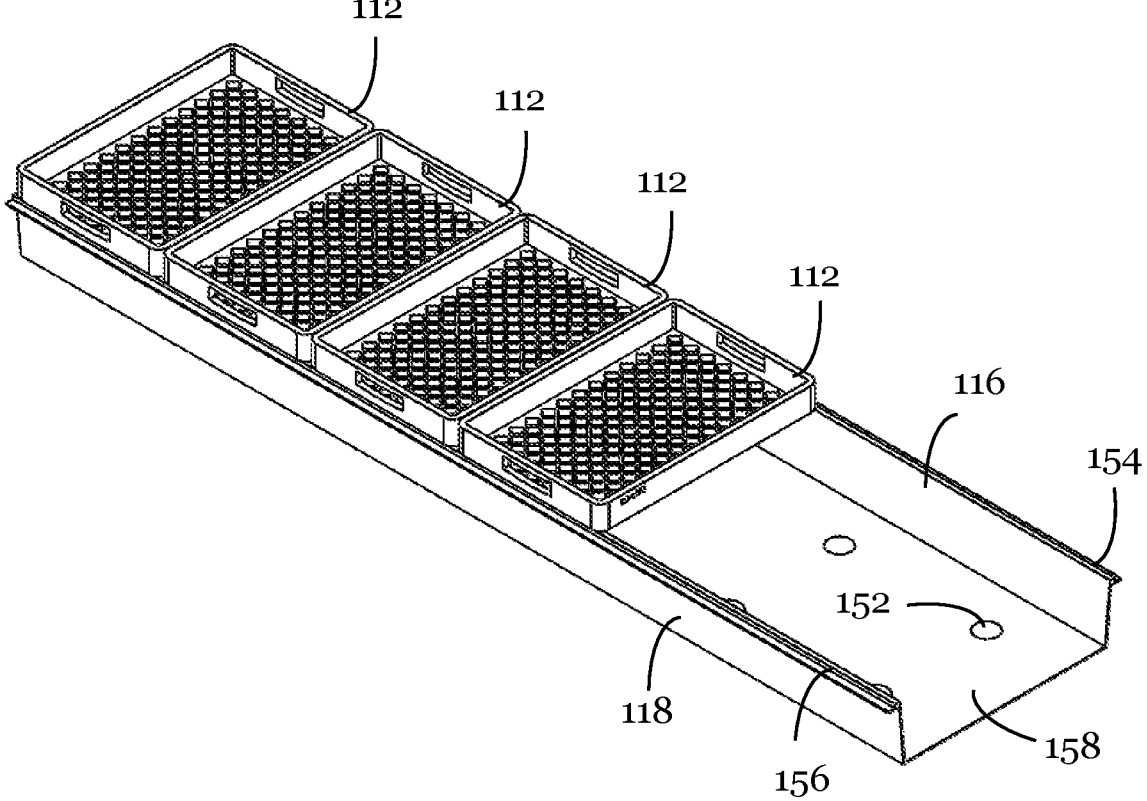
FIG. 17 is a perspective view of the aeroponics apparatus of FIG. 15 showing a plurality of shuttles and part of the support structure.

FIGS. 15 to 17 show an alternative embodiment of an aeroponic apparatus 102 of the present disclosure. The aeroponics apparatus 102 comprises a support structure having a support trough 158 with a first side wall 116 and second side wall 118. The support trough 158 has a plurality of ultrasonic nebulizers 152 located in the base connected to the power supply (not shown). On the top edge of the first side wall 116 and second side wall 118 there are first side wall track 154 and second side wall track 156 which support one or more shuttles 112 and which are adapted to cooperate with parts in the base of each shuttle 112 so that the shuttles 112 are easily movable on the support trough 158 so the shuttles 112 may be conveyed over the support structure.

Each shuttle 112 comprises a grow bed tray for holding crops above the support trough 158. In use, the ultrasonic nebulizers 152 are in acoustic contact with nutrient solution. Power is supplied to the support structure and, optionally the shuttle 112. In operation, the nebulizers generates an aerosol (usually with droplets having a diameter in the range 0.1 μm to 100 μm) of nutrient solution in the support trough 158 and thereby fertigates the roots of crops suspended in the grow bed tray of the shuttles 112.

Figure 18:
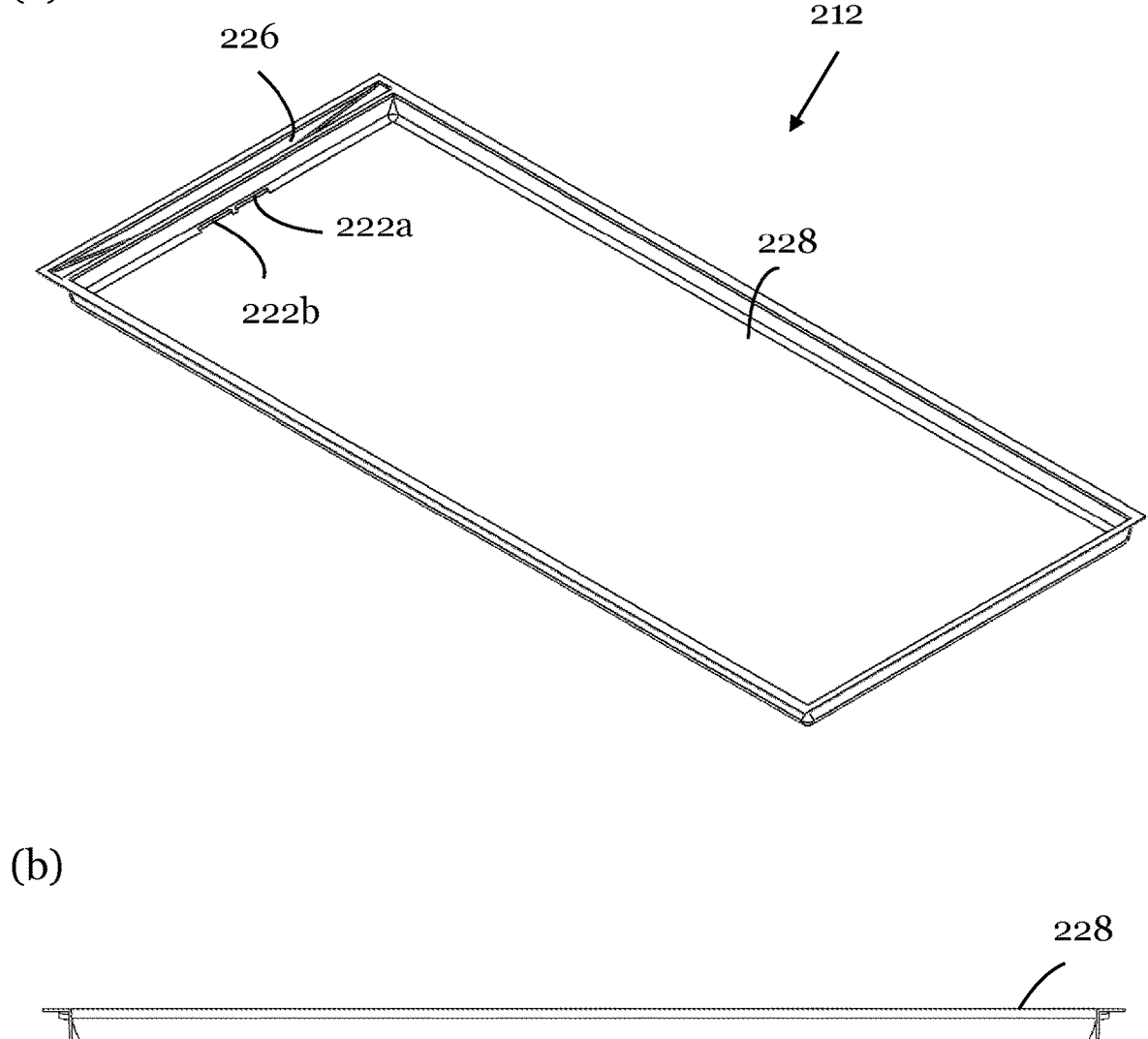
FIG. 18(a) shows a perspective view of an embodiment of a single shuttle/grow bed tray; and b) section view.

FIG. 18(a) shows a perspective view of an embodiment of a single shuttle/grow bed tray 212; and b) section view. The shuttle has a grow bed tray 228 (that may be a molded plastic insert) a nutrient solution trough 226 and nutrient solution ports 222a and b. The nutrient solutions ports 222 form nutrient solution entry and exit point for the grow bed tray 228. The ports 222 are low in the grow bed tray 228 to allow nutrient solution entry and exit but to reduce or prevent aerosol escaping when the tray is filled above the top of ports 222. Ultrasonic nebulizers (not shown) may be located on or under the base of the grow bed tray 228.

FIG. 19(a) shows a single shuttle 312 in another embodiment with crop supports 329 for holding crop trays 331 (a single crop tray 331 is shown in (a) for clarity, there may be a number in the shuttle/grow bed tray they space the crop trays 331 from the base of the grow bed tray 328). The shuttle has a grow bed tray 328 (that may be a molded plastic insert) in the shuttle body 313, with the grow bed tray 328 having a nutrient solution trough 326 and a single nutrient solution port 322 at the base of a nutrient port divider/wall 323. The nutrient solution port 322 forms a nutrient solution entry and exit point for the grow bed tray 328. The port 322 is low in the grow bed tray 328 to allow nutrient solution entry and exit but to reduce or prevent aerosol escaping when the tray 328 is filled above the top of the port 322. Ultrasonic nebulizers (not shown) may be located on or under the base of the grow bed tray 328.

Figure 19:
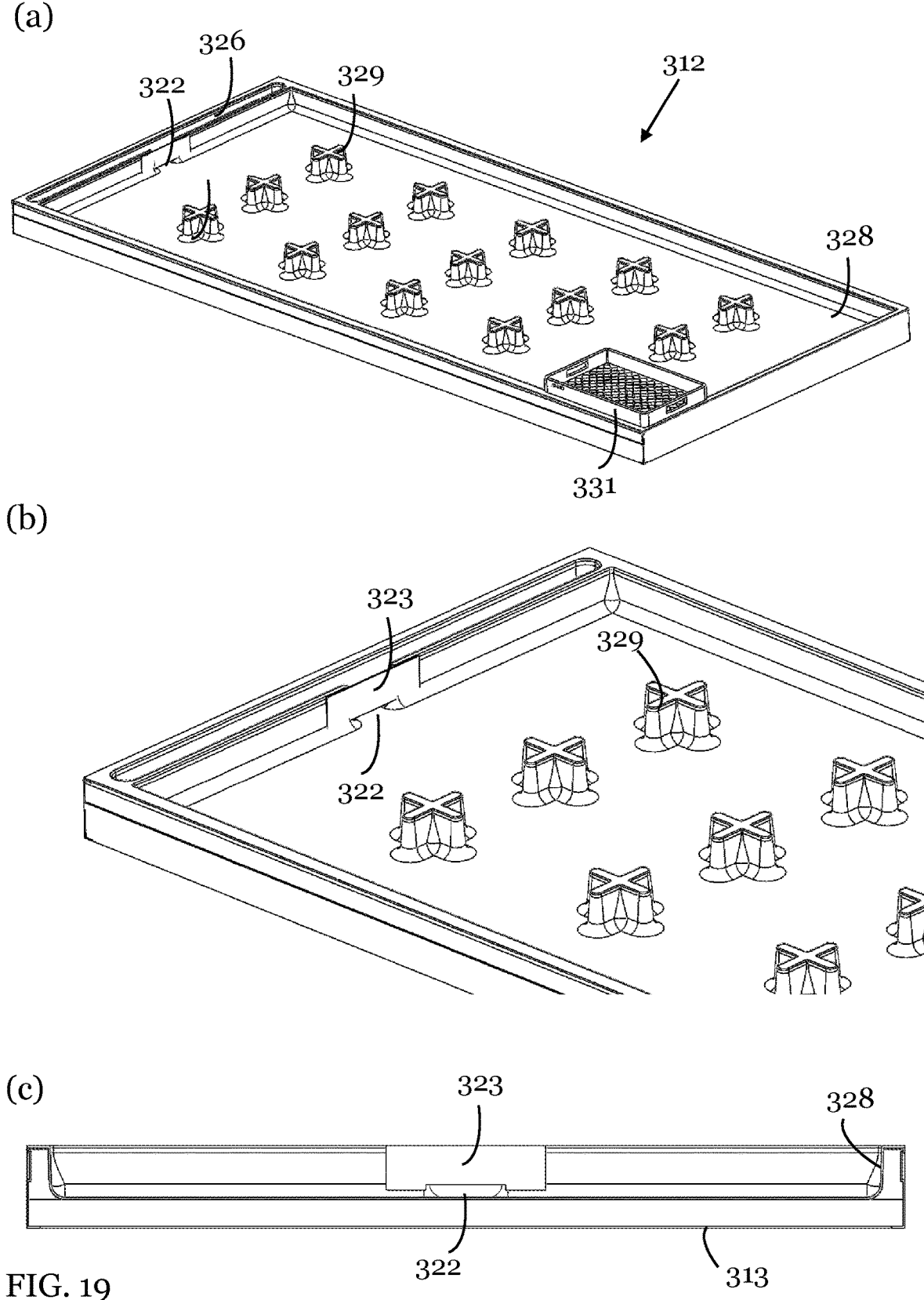
FIG. 19(a) shows a perspective view of an embodiment of a shuttle/grow bed tray; b) shows a magnified view of the nutrient trough and nutrient solution port; and (c) shows a section view.
Figure 20:
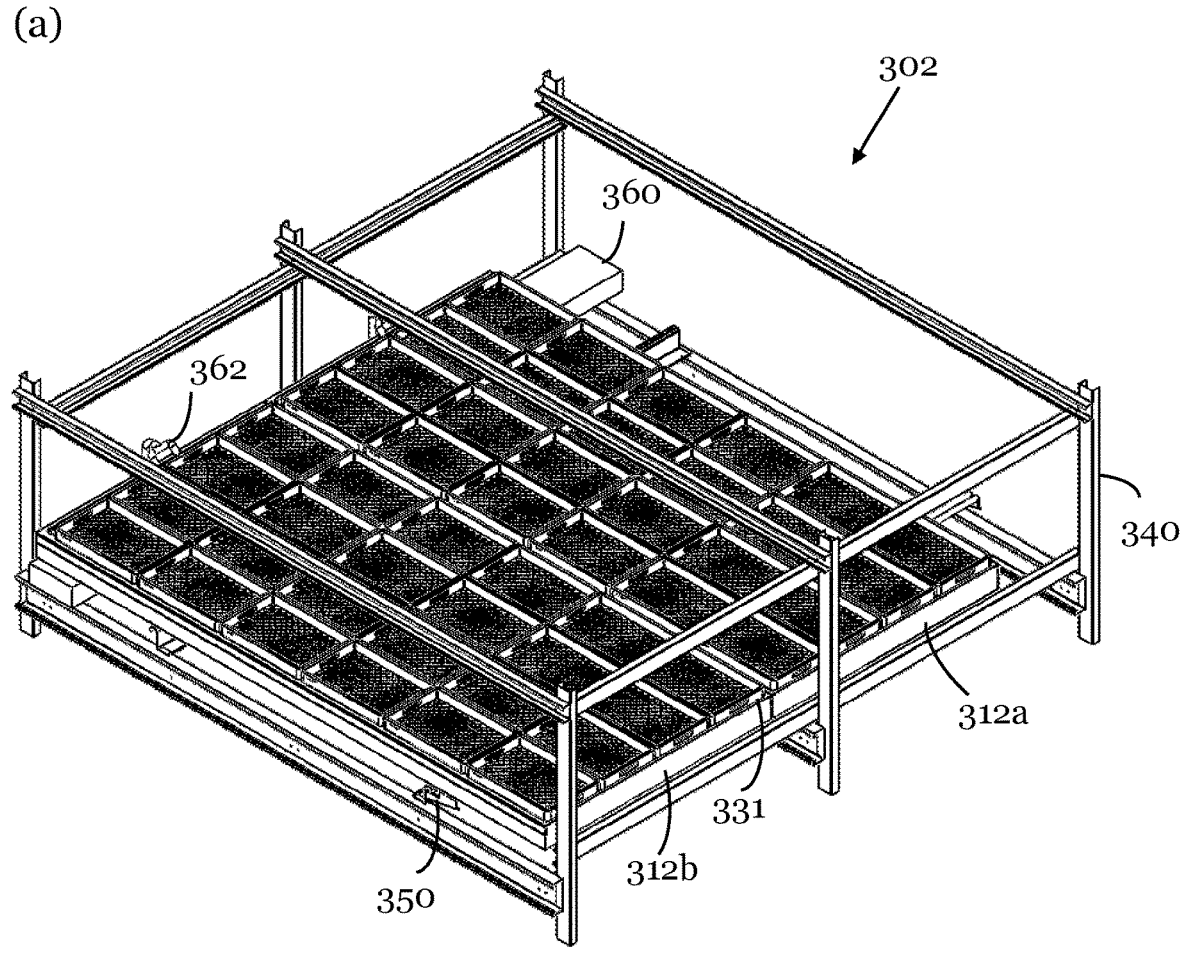
FIG. 20(a) shows a perspective view of an embodiment of an aeroponics apparatus (with two shuttles) and crop trays on a support structure with a water delivery system and power delivery system; (b) side view of the aeroponics apparatus showing the two shuttles on the support structure; and (c) underside view of the aeroponics apparatus.
Figure 20:
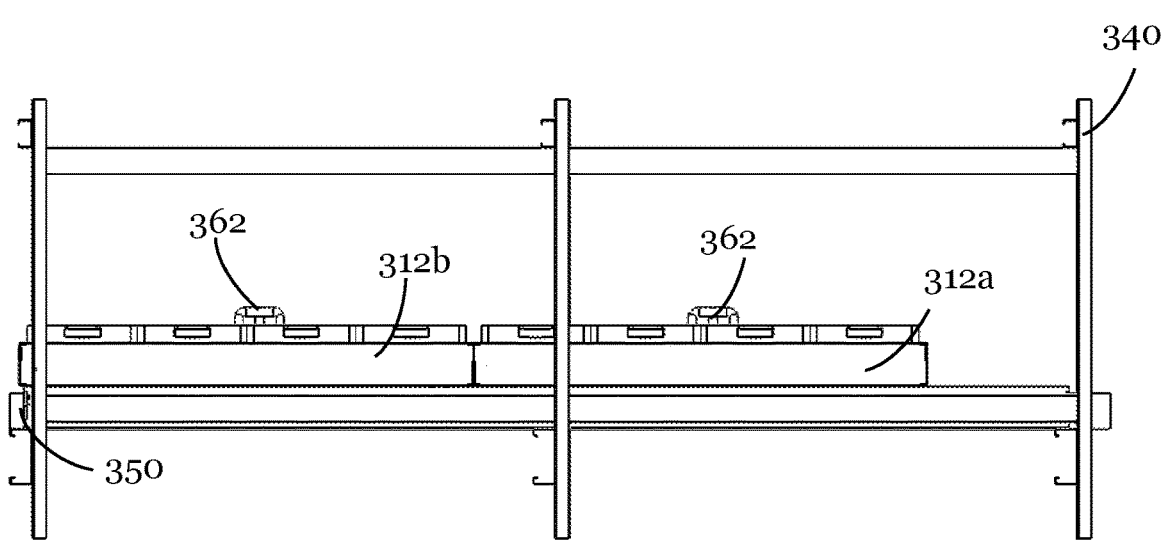
Figure 20C:
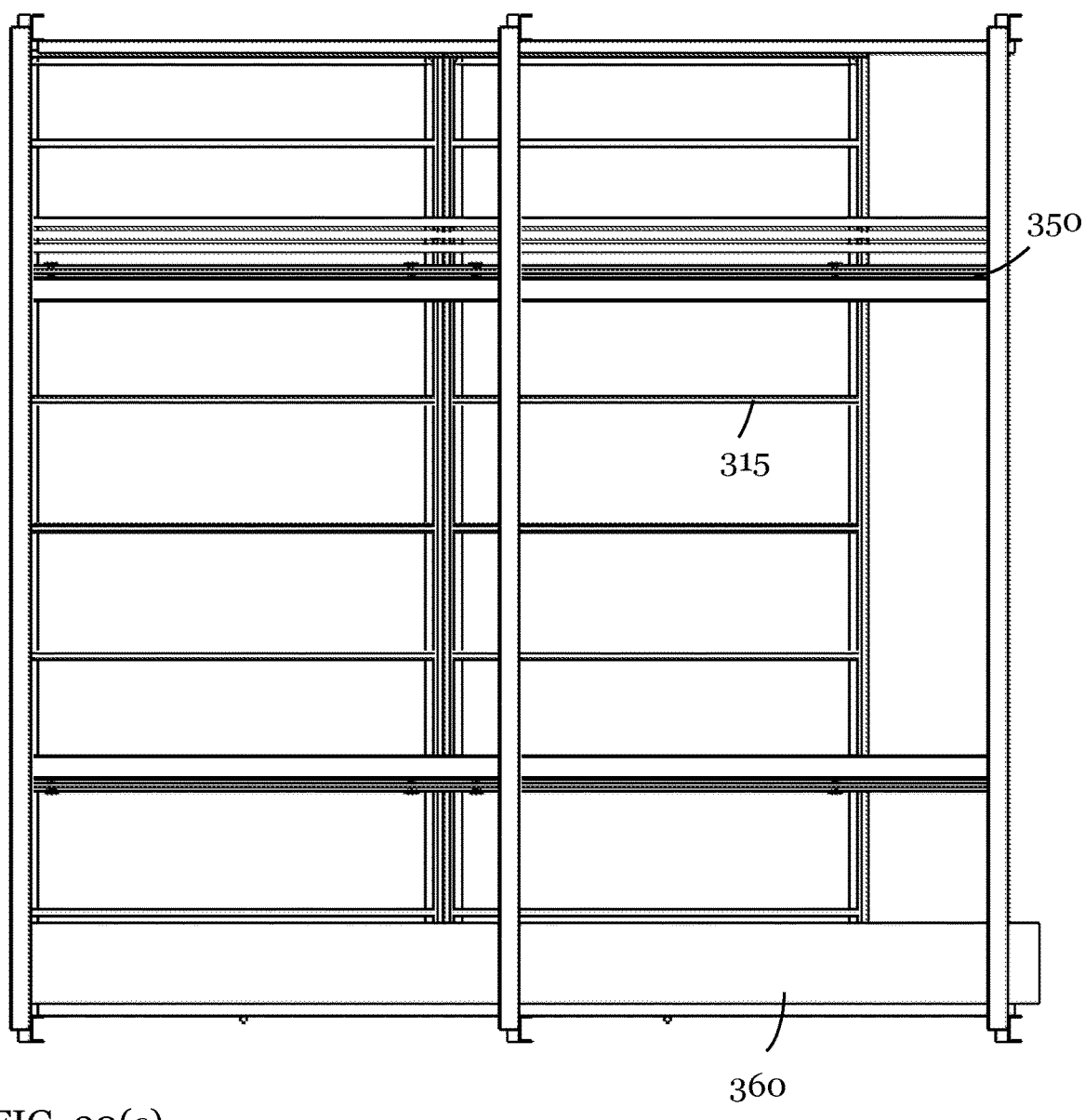
Figure 21A:
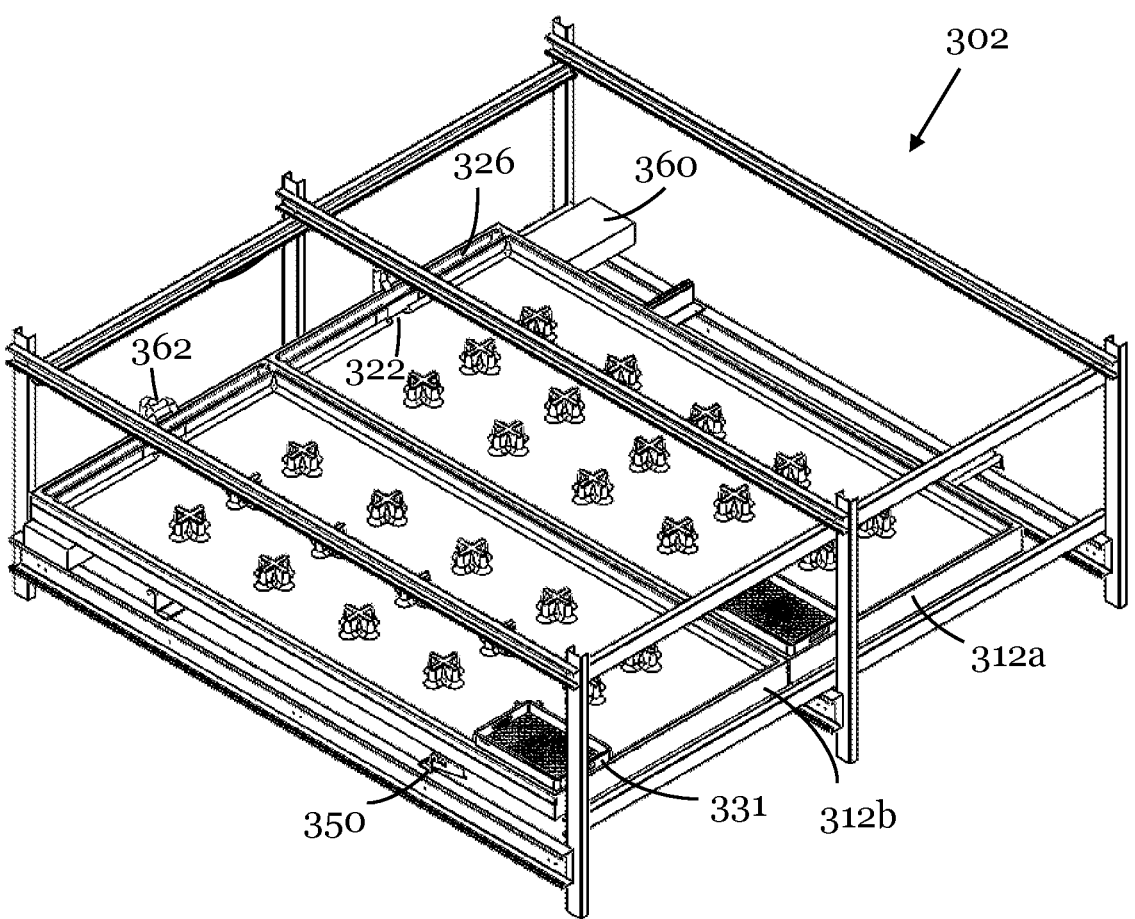
FIG. 21(a) shows a perspective view of an embodiment of an aeroponics apparatus (two shuttles) on a support structure with a water delivery system and power delivery system and one crop tray in each shuttle; (b) top view of the apparatus; (c) short side view of the apparatus; and (d) shows the long side view of the apparatus.
Figure 21B:
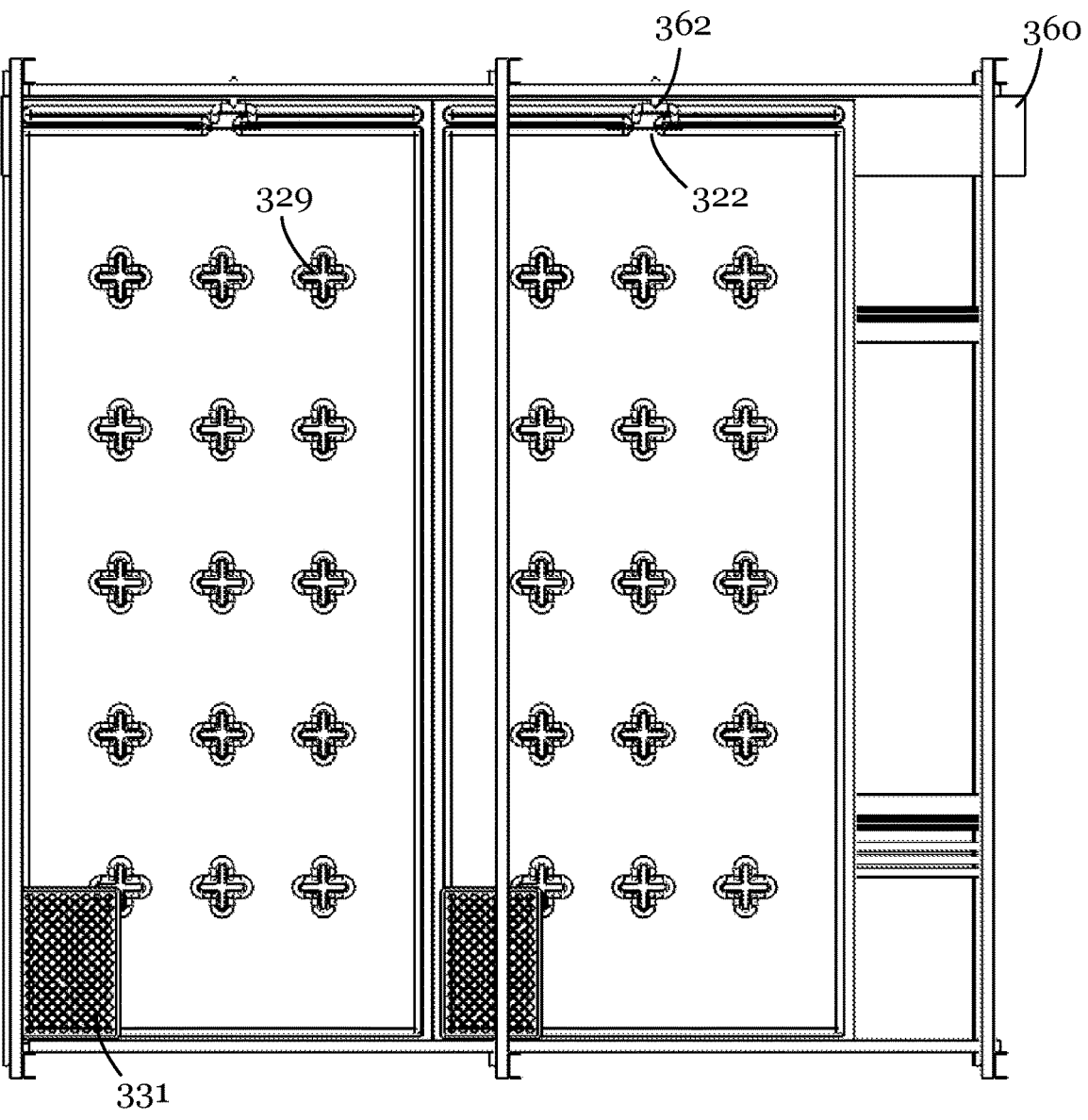
Figure 21C:
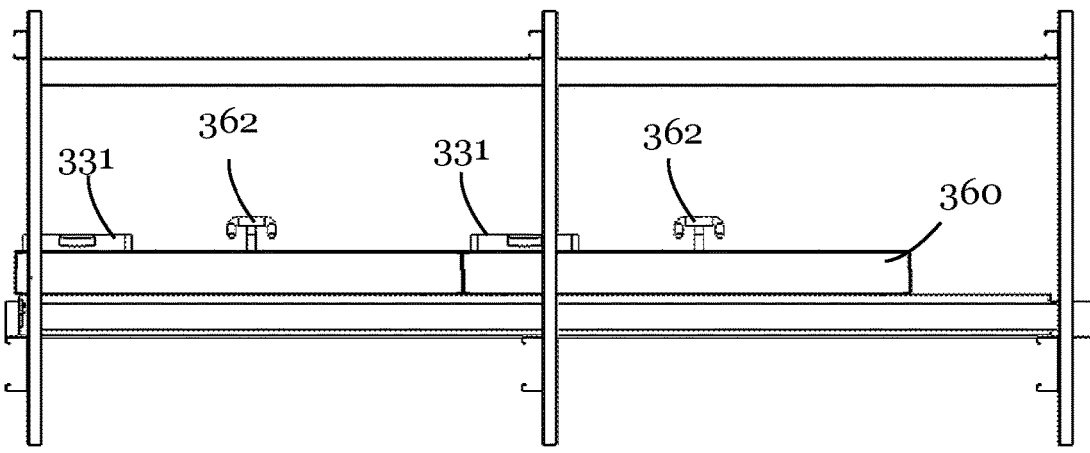
Figure 21D:
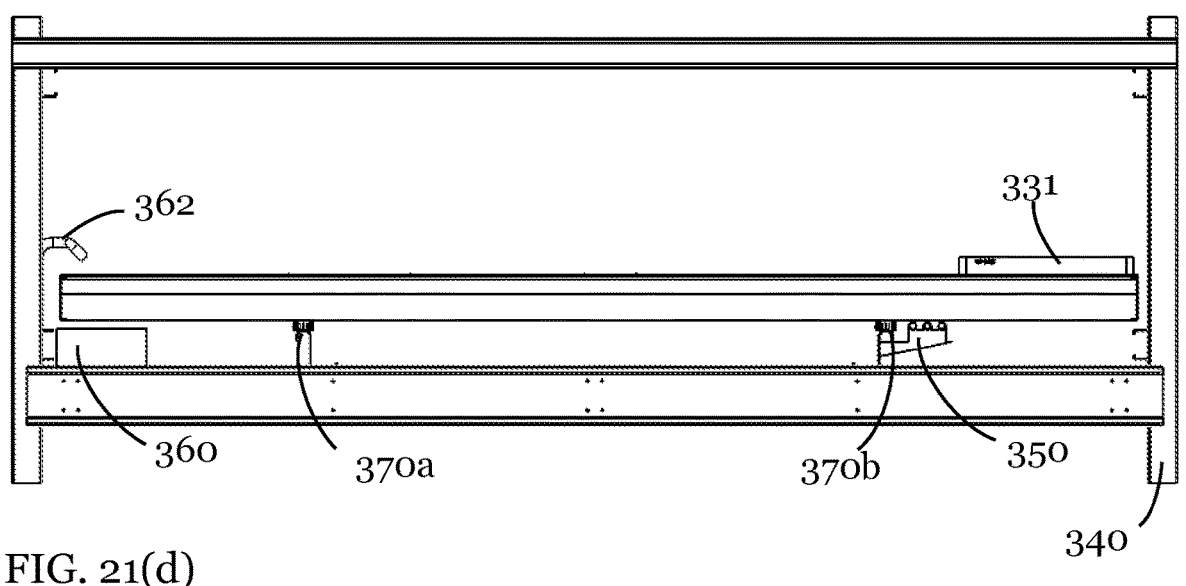

FIG. 20 shows views of an aeroponics apparatus 302 with two shuttles 312a and 312b that are as illustrated in FIG. 19. The shuttles 312 are movable on a support structure 340 with a water/nutrient solution delivery/distributing system 360 and power delivery/supply system 350 (at the opposite end of the support structure 340 to the nutrient solution distributing system 360). Nutrient solution dispensers 362 enable nutrient solution to be dispensed into the nutrient solution trough (see FIG. 19). Crop/plant trays 331 are located in each shuttle (see also FIG. 19). The shuttle frame 315 is visible in (c) that acts to support the grow bed tray 328 in the shuttle 312.

FIG. 21 also shows the embodiment of the aeroponics apparatus 302 as in FIG. 20 in different views and with only two crop trays 331 shown for clarity. The features illustrated are as described in FIGS. 19 and 20. In (d), on the right hand side is the power supply system 350 (connecting to the underside of the shuttle 312 using connectors (not shown) and on the left hand side is the water/nutrient solution distributing system 360. Rolling portions 370a and 370b are visible underneath the shuttles 312 to allow easier movement of the shuttles 312 on the support structure 340.

All publications mentioned in the above specification are herein incorporated by reference. Although illustrative embodiments of the present disclosure have been disclosed in detail herein, with reference to the accompanying drawings, it is understood that the present disclosure is not limited to the precise embodiment and that various changes and modifications can be effected therein by one skilled in the art without departing from the scope of the present disclosure as defined by the appended claims and their equivalents.

The disclosures of the published documents referred to herein are incorporated by reference in their entirety.

REFERENCE NUMERALS 2 aeroponics apparatus
4 support structure rail

6 power supply device
12 shuttle
14 first end wall
16 first side wall
18 second side wall
20 second end wall
22 tray nutrient solution port
24 grow bed tray end wall
26 nutrient solution trough
28 grow bed tray
30 trough nutrient solution port
32 trough nutrient solution inlet (or inlet port)
34 shuttle power connector
36 shuttle rolling portions
38 nutrient solution levelling device
40 support structure
42 horticultural lighting
44 support structure roller
46 grow bed tray
48 nutrient solution reservoir
50 power rail
52 ultrasonic nebulizer
102 aeroponics apparatus
116 first side wall
118 second side wall
152 ultrasonic nebulizers
154 first side wall track
156 second side wall track
158 support trough
212 shuttle
222 nutrient solution ports (a) and (b)
226 nutrient solution trough
228 grow bed tray
302 aeroponics apparatus
312 shuttle
313 shuttle body
315 shuttle frame
322 nutrient solution port
323 nutrient port divider/wall
326 nutrient solution trough
328 grow bed tray
329 crop support
331 plant tray
340 support structure
350 power supply system
360 nutrient distributing system
362 nutrient solution dispenser
370 rolling portions a and b.

The invention claimed is:

1. An aeroponic apparatus for commercial operation, the aeroponic apparatus comprising, a support structure comprising a power supply device;

at least one shuttle including rolling portions configured to engage the support structure and configured to move the at least one shuttle in a first direction and a second direction on the support structure between a plurality of different positions, the at least one shuttle comprising a grow bed tray for holding crops;

wherein the apparatus comprises one or more ultrasonic nebulizers configured to generate an aerosol for fertigating the crops in the grow bed tray; and wherein the at least one shuttle comprises a power connector configured to connect to the power supply device to supply power to the at least one shuttle, wherein the power supply device comprises a plurality of power supply docks spaced apart from each other along a length of the support structure, wherein the at least one shuttle is configured to roll on the support structure between the plurality of power supply docks, and wherein the power connector of the at least one shuttle is configured to connect to each power supply dock individually.

2. The aeroponic apparatus as claimed in claim 1, wherein the at least one shuttle comprises the one or more ultrasonic nebulizers.

3. The aeroponic apparatus as claimed in claim 1, wherein the support structure comprises a conveyor device to move the shuttle in the first direction and the second direction on the support structure.

4. The aeroponic apparatus as claimed in claim 3, wherein the conveyor device extends in at least one of the first direction and the second direction on the support structure.

5. The aeroponic apparatus as claimed in claim 1, wherein the shuttle is arranged to move in a direction normal to the support structure.

6. The aeroponic apparatus as claimed in claim 1, wherein the one or more ultrasonic nebulizers are mounted on a base of the grow bed tray.

7. The aeroponic apparatus as claimed in claim 1, wherein the one or more ultrasonic nebulizers each comprise an ultrasonic transducer.

8. The aeroponic apparatus as claimed in claim 1, wherein the grow bed tray comprises a crop support configured to hold the crops spaced from a base of the grow bed tray to form a root space above the base of the grow bed tray.

9. The aeroponic apparatus as claimed in claim 1, wherein, in use, the grow bed tray comprises water and nutrients in a bottom portion of the grow bed tray in contact with the one or more ultrasonic nebulizers.

10. The aeroponic apparatus as claimed in claim 9, wherein the one or more ultrasonic nebulizers are configured to generate an aerosol mist in a root space to fertigate the crops.

11. The aeroponic apparatus as claimed in claim 1, wherein the support structure further comprises a water storage system and/or a water distribution apparatus configured to provide water to the shuttle.

12. The aeroponics apparatus as claimed in claim 7, wherein the ultrasonic transducer comprises a piezoelectric transducer.

13. A method for producing crops, the method comprising:

positioning a plant support spaced from a base of a grow bed tray of an aeroponic apparatus to form a root space above the base of the grow bed tray, wherein the aeroponic apparatus comprises:

a support structure comprising a power supply device;

at least one shuttle including rolling portions configured to engage the support structure and configured to move the at least one shuttle on the support structure between a plurality of different positions, wherein the at least one shuttle comprises the grow bed tray and a power connector configured to connect to the power supply device to supply power to the at least one shuttle; and wherein the apparatus comprises one or more ultrasonic nebulizers configured to generate an aerosol for fertigating the crops supported by the plant support, wherein the power supply device comprises a plurality of power supply docks spaced apart from each other along a length of the support structure, wherein the at least one shuttle is configured to roll on the support structure between the plurality of power supply docks, and wherein the power connector of the at least one shuttle is configured to connect to each power supply dock individually;

connecting the power connector of the at least one shuttle to the power supply device; and using the one or more ultrasonic nebulizers to nebulize water disposed in the grow bed tray to generate nebulized aerosol nutrient solution within the root space.

14. The method as claimed in claim 13, wherein nebulizing water comprises nebulizing the water to provide a controlled droplet size distribution.

15. The method as claimed in claim 14, wherein the droplet size distribution comprises droplets having a diameter in the range 0.1 μm to 100 μm.

16. The aeroponic apparatus of claim 1, wherein the power connector of the at least one shuttle is configured to automatically connect to each respective power supply dock when positioned proximate the respective power supply dock and automatically disconnect from the respective power supply dock when moved away from the respective power supply dock.

17. The aeroponic apparatus of claim 1, wherein the support structure includes a pair of support rails extending parallel to each other, wherein the plurality of power supply docks are arranged along a length of a first support rail of the pair of support rails, and wherein the at least one shuttle is configured to roll on the pair of support rails between the plurality of power supply docks.

18. The aeroponic apparatus of claim 1, wherein the power supply device comprises a power supply rail extending across the support structure.

* * * * *